US009185237B2

(12) United States Patent
McMurry et al.

(10) Patent No.: US 9,185,237 B2
(45) Date of Patent: Nov. 10, 2015

(54) METHODS, SYSTEMS, AND COMPUTER READABLE MEDIA FOR ADJUSTING A QUOTA CONSUMPTION RATE

(71) Applicant: Tekelec, Inc., Morrisville, NC (US)

(72) Inventors: Sam Eric McMurry, Richardson, TX (US); Apirux Bantukul, Cary, NC (US)

(73) Assignee: Tekelec, Inc., Morrisville, NC (US)

( * ) Notice: Subject to any disclaimer, the term of this patent is extended or adjusted under 35 U.S.C. 154(b) by 136 days.

(21) Appl. No.: 13/832,115

(22) Filed: Mar. 15, 2013

(65) Prior Publication Data

US 2014/0273922 A1   Sep. 18, 2014

(51) Int. Cl.
*H04M 11/00*   (2006.01)
*H04M 15/00*   (2006.01)
*H04L 12/14*   (2006.01)

(52) U.S. Cl.
CPC .......... *H04M 15/58* (2013.01); *H04L 12/1407* (2013.01); *H04L 12/1435* (2013.01); *H04M 15/62* (2013.01); *H04M 15/66* (2013.01); *H04M 15/80* (2013.01); *H04M 15/8022* (2013.01); *H04M 15/81* (2013.01)

(58) Field of Classification Search
CPC ......... H04W 4/24; H04W 4/26; H04M 15/58; H04M 15/62; H04M 15/66; H04M 15/80; H04M 15/8022; H04M 15/81; H04L 12/1407; H04L 12/1435
USPC .............................. 455/405; 709/206; 370/229
See application file for complete search history.

(56) References Cited

U.S. PATENT DOCUMENTS

| | | | |
|---|---|---|---|
| 5,570,416 A | 10/1996 | Kroll | |
| 6,195,543 B1 | 2/2001 | Granberg | |
| 6,393,269 B1 | 5/2002 | Hartmaier et al. | |
| 6,955,667 B1 | 11/2005 | Trabandt et al. | |
| 6,965,667 B2 | 11/2005 | Trabandt et al. | |
| 7,787,858 B2 | 8/2010 | Koskinen et al. | |
| 8,374,081 B2 * | 2/2013 | Farrugia et al. | 370/229 |
| 8,694,629 B2 * | 4/2014 | Cutler et al. | 709/224 |
| 8,825,003 B2 | 9/2014 | Ravishankar et al. | |
| 8,989,056 B2 | 3/2015 | Baniel et al. | |
| 2001/0040949 A1 | 11/2001 | Blonder et al. | |
| 2005/0136889 A1 | 6/2005 | Zackrisson et al. | |

(Continued)

FOREIGN PATENT DOCUMENTS

| | | |
|---|---|---|
| CN | 1323500 A | 11/2001 |
| CN | 101971653 A | 2/2011 |

(Continued)

OTHER PUBLICATIONS

Applicant-Initiated Interview Summary for U.S. Appl. No. 12/335,416 (Jan. 29, 2014).

(Continued)

*Primary Examiner* — Amancio Gonzalez
(74) *Attorney, Agent, or Firm* — Jenkins, Wilson, Taylor & Hunt, P.A.

(57) ABSTRACT

The subject matter described herein includes systems, methods, and computer readable media for adjusting a quota consumption rate. An exemplary method occurs at a first policy node. The method includes detecting a trigger for adjusting a quota consumption rate associated with a subscriber. The method further includes in response to detecting the trigger, adjusting the quota consumption rate associated with the subscriber.

19 Claims, 5 Drawing Sheets

(56) References Cited

U.S. PATENT DOCUMENTS

| | | | |
|---|---|---|---|
| 2006/0148446 | A1 | 7/2006 | Karlsson |
| 2006/0288963 | A1 | 12/2006 | Raukola et al. |
| 2007/0242816 | A1 | 10/2007 | Cai et al. |
| 2009/0061856 | A1 | 3/2009 | Kazmi |
| 2009/0156163 | A1 | 6/2009 | Ravishankar et al. |
| 2010/0010922 | A1 | 1/2010 | Foottit et al. |
| 2011/0208628 | A1 | 8/2011 | Foottit et al. |
| 2012/0124149 | A1* | 5/2012 | Gross et al. .................. 709/206 |
| 2012/0202455 | A1 | 8/2012 | Cai |
| 2013/0176908 | A1 | 7/2013 | Baniel et al. |

FOREIGN PATENT DOCUMENTS

| | | |
|---|---|---|
| CN | 200880126771.8 | 12/2014 |
| EP | 2 398 262 A1 | 12/2011 |
| JP | 2002-204319 | 7/2002 |
| WO | WO 00/19702 | 4/2000 |
| WO | WO 00/22871 | 4/2000 |
| WO | WO 03/073693 A1 | 9/2003 |
| WO | WO 2009/076675 A1 | 6/2009 |
| WO | WO 2013/103960 A1 | 7/2013 |

OTHER PUBLICATIONS

Second Office Action for Chinese Patent Application No. 200880126771.8 (Sep. 4, 2013).
Non-Final Office Action for U.S. Appl. No. 12/335,416 (Oct. 23, 2013).
Interview Summary for U.S. Appl. No. 12/335,416 (May 20, 2013).
Notification of Transmittal of the International Search Report and the Written Opinion of the International Searching Authority, or the Declaration for International Application No. PCT/US2013/020528 (Apr. 29, 2013).
Final Office Action for U.S. Appl. No. 12/335,416 (Jan. 30, 2013).
First Office Action for Chinese Patent Application No. 200880126771.8 (Oct. 10, 2012).
"Digital cellular telecommunications system (Phase 2+); Universal Mobile Telecommunications System (UMTS); LTE; Policy and charging control: Spending limit reporting over Sy reference point (3GPP TS 29.219 version 11.2.0 Release 11)," ETSI TS 129 219 V11.2.0, pp. 1-22 (Oct. 2012).
Non-Final Official Action for U.S. Appl. No. 12/335,416 (Jun. 28, 2012).
Final Official Action for U.S. Appl. No. 12/335,416 (Dec. 6, 2011).
Tekelec et al., "Discussion paper on Usage-reporting from PCRF to OCS over Sy," 3GPP TSG SA WG2 #86, pp. 1-2 (Jul. 11-15, 2011).
Official Action for U.S. Appl. No. 12/335,416 (Apr. 20, 2011).
Ericsson et al., "IE provided over Sy interface," 3GPP TSG SA WG2 #83, TD S2-110980, pp. 1-7 (Feb. 2011).
Cheboldaeff, "Interaction between an Online Charging System and a Policy Server," ICN 2011: The Tenth International Conference on Networks, pp. 47-51 (2011).
Communication of European publication number and information on the application of Article 67(3) EPC for European application No. 08859561.6 (Sep. 1, 2010).
Notification of Transmittal of the International Search Report and the Written Opinion of the International Searching Authority, or the Declaration for corresponding International Application No. PCT/US2008/086866 (May 25, 2009).
Notice of Allowance and Fee(s) Due for U.S. Appl. No. 13/735,670 (Nov. 10, 2014).
Notice of Grant for Chinese Patent Application No. 200880126771.8 (Nov. 4, 2014).
European Search Report for European Patent Application No. 08859561.6 (Oct. 21, 2014).
Communication of European publication number and information on the application of Article 67(3) EPC for European Application No. 13733784.6 (Oct. 15, 2014).
Non-Final Office Action for U.S. Appl. No. 13/735,670 (Jul. 9, 2014).
Third Office Action for Chinese Patent Application No. 200880126771.8 (May 4, 2014).
Notice of Allowance and Fee(s) Due for U.S. Appl. No. 12/335,416 (May 2, 2014).

* cited by examiner

METHODS, SYSTEMS, AND COMPUTER READABLE MEDIA FOR ADJUSTING A QUOTA CONSUMPTION RATE

TECHNICAL FIELD

The subject matter described herein relates to methods and systems for conducting policy control in a communications network. More particularly, the subject matter described herein relates to methods, systems, and computer readable media for adjusting a quota consumption rate.

BACKGROUND

Presently, communication network service providers offer a variety of different network services to mobile device subscribers. Subscription plans offered by service providers are typically characterized by a combination of different performance categories and various quota amounts. For example, a subscriber pays a monthly fee for a subscription plan with a given bandwidth speed, a given amount of download size quota, and/or a specific quality of service (QoS) level. Similarly, another subscriber may subscribe to a subscription plan with a lower bandwidth speed, less quota allocation, and/or a lower QoS level. Regardless of the quota amount associated with a subscription plan, a service provider typically suspends the subscriber's service if the subscriber consumes the allotted quota. Alternatively, the network service provider can apply additional fees to the subscriber's subscription plan to continue providing service in excess of the subscription plan quota. To increase profits and/or improve user experience, service providers and/or subscribers may benefit from additional charging behaviors.

Accordingly, there exists a need for methods, systems, and computer readable media for adjusting a quota consumption rate.

SUMMARY

The subject matter described herein includes systems, methods, and computer readable media for adjusting a quota consumption rate. According to one method, the method occurs at a first policy node. The method includes detecting a trigger for adjusting a quota consumption rate associated with a subscriber and in response to detecting the trigger, adjusting the quota consumption rate associated with the subscriber.

A system for adjusting a quota consumption rate is also disclosed. The system includes a first policy node. The first policy node includes a quota consumption rate adjustment (QCRA) module configured to detect a trigger for adjusting a quota consumption rate associated with a subscriber and to adjust the quota consumption rate associated with the subscriber in response to detecting the trigger.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, methods, systems, and computer readable media are provided for adjusting a quota consumption rate. In some embodiments, a quota consumption rate may be value, rate, or indicator for indicating a rate in which a data usage quota is consumed. For example, a subscriber may have monthly data plan with a two gigabyte (GB) data usage quota. If the subscriber has a quota consumption rate of 100%, the subscriber's data usage quota may be reduced by 1 byte for every 1 byte the subscriber uses or consumes (e.g., from watching videos or streaming music). However, if the subscriber has a quota consumption rate less than 100%, the subscriber may receive more data than his allotted data usage quota. For example, if the subscriber has a quota consumption rate of 50%, the subscriber's data usage quota may be reduced by 1 byte for every 2 bytes the subscriber uses, thereby effectively doubling the subscriber's data usage quota.

In some embodiments, adjusting a quota consumption rate may be in response to a trigger and/or may be used to entice subscribers to consume data differently. For example, a quota consumption rate may be increased (e.g., effectively decreasing a subscriber's data usage quota) during congested times or days or when using a heavily utilized resource. In another example, a quota consumption rate may be decreased (e.g., effectively increasing a subscriber's data usage quota) during a network's off hours, when using a resource is underutilized, during a promotion, or at a sponsored event or area.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
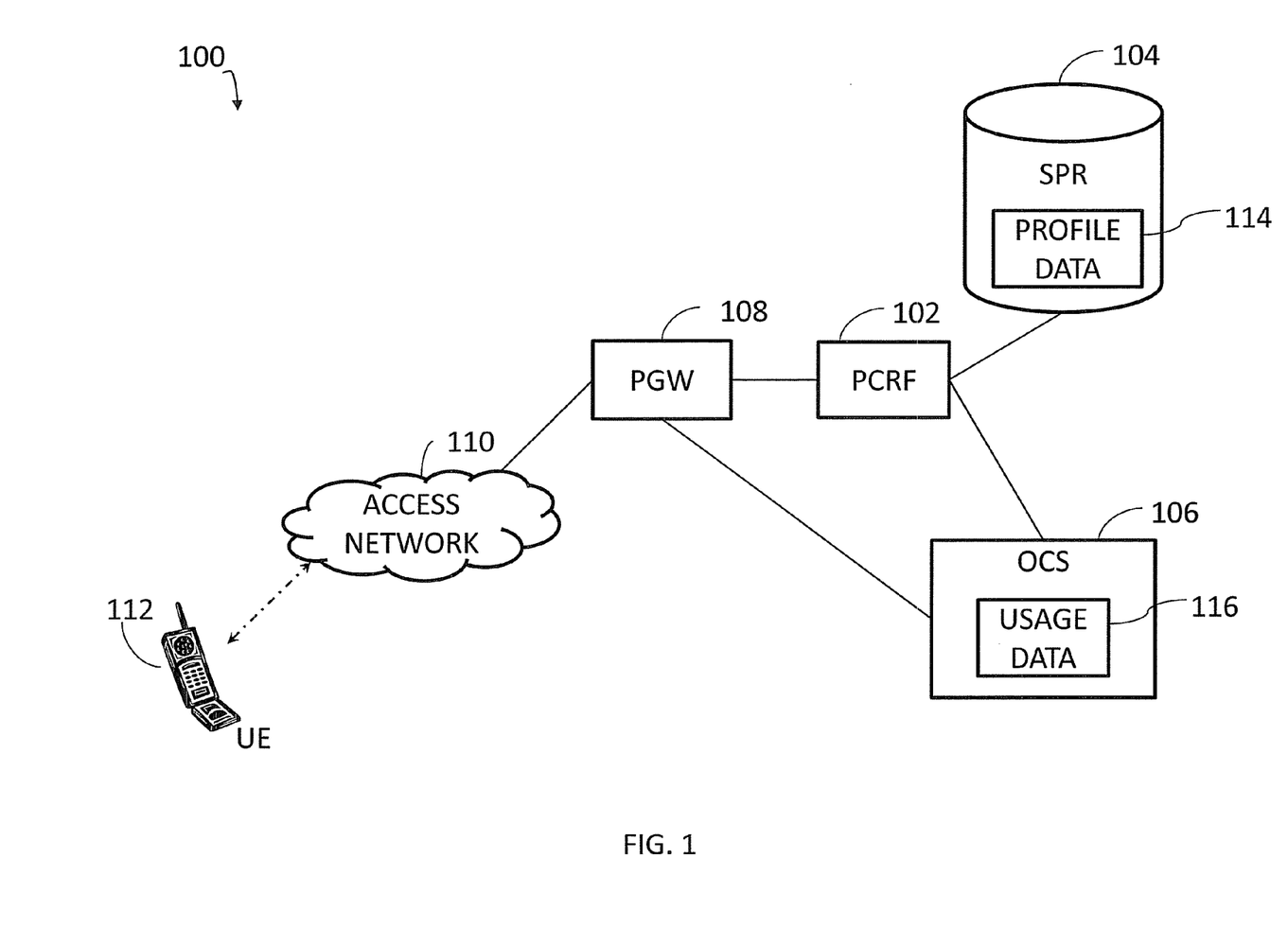
FIG. 1 is a diagram illustrating an exemplary communication network for adjusting a quota consumption rate according to an embodiment of the subject matter described herein.

FIG. 1 is a block diagram illustrating an exemplary network 100 that may include a policy server, such as a policy and charging rules function (PCRF) 102, a subscriber profile repository (SPR) 104, an online charging system (OCS) 106, and a packet data network (PDN) gateway (PGW) 108.

PCRF 102 may represent any suitable entity for performing one or more policy and/or charging functions. For example, PCRF 102 may generate policy and charging control (PCC) rules and provide the rules to one or more network elements (e.g., PGW 108). In some embodiments, PCRF 102 may be configured to determine and create policy rules for subscribers that subscribe to services in network 100. The policy rules created by PCRF 102 may pertain to services, QoS levels, and charging rules associated with each subscriber on an individual basis.

In some embodiments, PCRF 102 may include a module hosted and executed by a Diameter-based network element or server. Network 100 may also include an access network 110 that communicatively connects PGW 108 to a user equipment (UE) device 112 associated with a subscriber. UE device 112 may include any mobile device, such as a mobile smart phone, a tablet computer device, a personal digital assistant (PDA), or the like.

In some embodiments, PCRF 102 (or any other policy server) may be configured to request quota usage information from OCS 106. The quota usage information may be requested and received via an application interface with OCS 106 (e.g., an Sy interface). In some embodiments, PCRF 102 may request the quota usage information from OCS 106 by sending a Diameter request message that may include at least one of Diameter session identifier information, subscriber identifier information (e.g., IMSI), subscriber tier information, subscriber service type identifier information, and/or other information. Upon receiving the request, OCS 106 may be configured to use the provided information provided to determine the appropriate subscriber quota usage information, which may be ultimately returned to requesting PCRF 102.

In some embodiments, PCRF 102 may include functionality (e.g., one or more modules) for maintaining, reporting, and/or adjusting a quota consumption rate. For example, in networks where PCRF 102 does not communicate with OCS 106 for quota information, PCRF 102 may store a quota consumption rate for one or more subscribers. The quota consumption rate may be a variable (e.g., a percentage) used in determining a data usage quota for a given subscriber or flow (e.g., a session). OCS 106 may calculate or compute an allotted quota, e.g., by multiplying a remaining data quota amount and a quota consumption rate. In some embodiments, a quota consumption rate may be adjusted in response to triggers, such as service tiers or time of day. After determining an acceptable quota, PCRF 102 may generate a PCC rule and/or provide quota information to PGW 108 and/or another entity.

OCS 106 may represent any suitable entity for performing one or more charging functions. In some embodiments, OCS 106 may receive subscriber usage data (e.g., traffic and signaling data generated or received by UE 112) from PGW 108 and/or another entity. OCS 106 may be configured to maintain a subscriber usage database 116 to record and store the subscriber usage data received from PGW 108. In some embodiments, OCS 106 may be configured to utilize usage database 116 to distinguish and keep track of specific data usage (e.g., on a per quota bucket basis) for each subscriber.

In some embodiments, OCS 106 may include functionality (e.g., one or more modules) for maintaining, reporting, and/or adjusting a quota consumption rate. For example, OCS 106 may store a quota consumption rate for one or more subscribers in database 116. The quota consumption rate may be a variable used in determining a data usage quota for a given subscriber or flow. OCS 106 may calculate or compute an allotted quota, e.g., by multiplying a remaining data quota amount and a quota consumption rate. In some embodiments, a quota consumption rate may be adjusted in response to triggers, such as network congestion or previous data usage. For example, if a subscriber is known to be a light consumer of data, a quota consumption rate may be decreased to entice the subscriber to consume more data. After determining an acceptable quota, OCS 106 may provide quota information to PCRF 102 and/or another entity.

PGW 108 may include any gateway element in network 100 configured to receive packet communications from UE 112 via access network 110 as well as reporting the usage associated with UE 112 to OCS 106 (e.g., via a Gy interface). PGW 108 may also be configured to provide network condition data (e.g., traffic load conditions) to PCRF 102 and/or OCS 106. PGW 108 may also be configured to execute the policy rules provided by PCRF 102. In some embodiments, PGW 108 may include any network element configured to support or host at least one of a policy and charging enforcement function (PCEF), a bearer binding and event reporting function (BBERF), a deep packet inspection (DPI) function, a traffic detection function (TDF), or any other like network element function.

SPR 104 may include a database configured to store profile information pertaining to subscribers of network 100. For example, the stored subscriber profile data may include a subscription plan code (e.g., a billing plan code or name) and the entitlements associated with the subscription plan code. Exemplary entitlements include, but are not limited to, voice over Internet protocol (VoIP) service, video chat, domestic roaming, international roaming, MiFi, data, gifts (e.g., special promotions), and specific equipment. In some embodiments, SPR 104 may be integrated with one or more network elements or may be distributed across multiple computing platforms or devices.

In some embodiments, UE 112 may register for services with the network in by initiating a network attachment procedure. For example, UE 112 can send a user attach request message to PGW 108. In response to receiving the attachment request message, PGW 108 may send a credit control request (CCR) message to PCRF 102. PCRF 102 may then send a user-data-request (UDR) message containing a user identifier to SPR 104 to request a subscription plan code and/or plan entitlements associated with the subscriber. For example, SPR 104 may be configured to store subscription plan data in a local profile database 114. Alternatively, SPR 104 may query an external database containing the user's subscription plan information.

Figure 2:
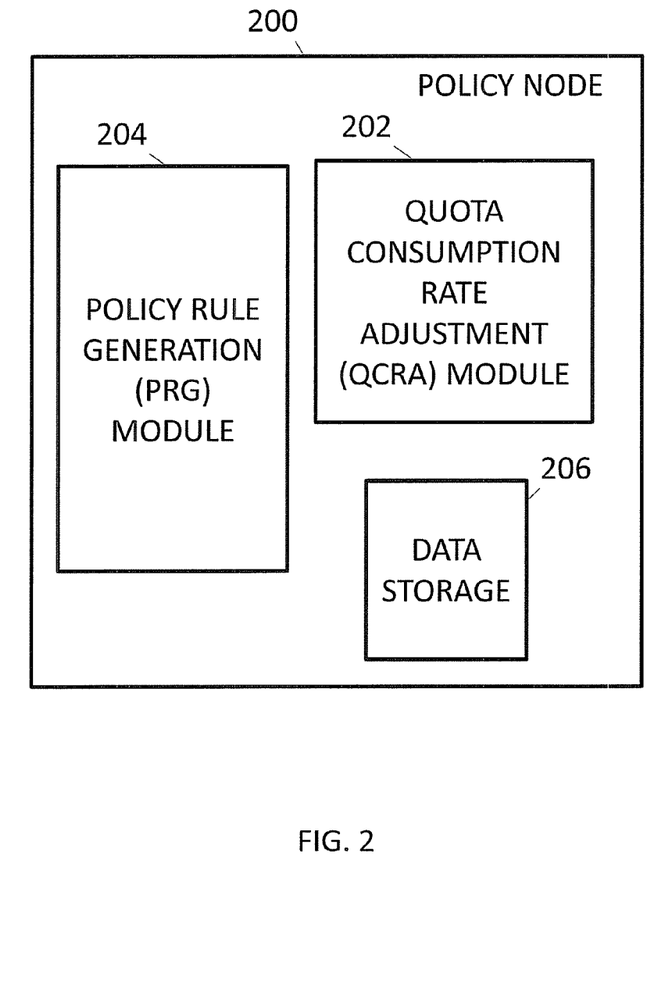
FIG. 2 is a diagram illustrating an exemplary device for adjusting a quota consumption rate according to an embodiment of the subject matter described herein.

FIG. 2 is a diagram illustrating an exemplary policy node 200 for adjusting a quota consumption rate according to an embodiment of the subject matter described herein. Policy node 200 may be any suitable entity for performing one or more functions associated with policy and/or charging control. For example, policy node 200 may include PCRF 102, OCS 106, a policy server, or another node. Policy node 200 may include a quota consumption rate adjustment (QCRA) module 202, a policy rule generation (PRG) module, and data storage 206. In some embodiments, policy node 200 may include functionality distributed across multiple computing platforms or devices.

QCRA module 202 may be any suitable entity (e.g., software executing on a processor) for maintaining, adjusting, and/or reporting a quota consumption rate or other quota related information. QCRA module 202 may access various databases and/or data storage 206. For example, QCRA module 202 may access a database containing quota usage information for one or more subscribers. QCRA module 202 may also communicate with various nodes and entities in network 100.

In some embodiments, QCRA module 202 may include functionality for adjusting a quota consumption rate in response to detecting one or more triggers. For example, QCRA module 202 may be configured to respond to various triggers defined by one or more data usage rules. For example, a data usage rule may indicate one or more triggers for increasing or decreasing a quota consumption rate and may indicate the amount to adjust the quota consumption rate for the triggers.

In some embodiments, triggers may be based on or include information derived from messages received from UE 112 or other nodes in network 100. In some embodiments, triggers may be based on or include information derived from previous data usage of a subscriber, e.g., traffic profile statistics stored at data storage 200 or elsewhere in network 100.

In some embodiments, a trigger for adjusting a quota consumption rate may include a message, a congestion condition, a network condition, a time of day, a day, a promotion, a location, a service requested or provided, a type of traffic requested or provided, a subscription plan, an event, a type of user device, usage, information about the subscriber, information about a user device associated with the subscriber, information about a network associated with the subscriber, or a combination of two or more triggers.

In some embodiments, QCRA module 202 may modify a data usage quota for a subscriber using a quota consumption rate. For example, QCRA module 202 may retrieve a remaining data quota associated with a subscriber and a quota consumption rate associated with the subscriber. In this example, QCRA module 202 may divide the remaining data quota by the quota consumption rate (e.g., represented as a value between (0-1.0)) to compute a modified remaining data quota, e.g., 500 MB×0.5=1000 MB. In some embodiments, a modified remaining data quota may be used in generating one or more PCC rules.

In some embodiments, a quota consumption rate may be adjusted for certain flows, services, subscribers, user devices, and/or data types. For example, when a network utilized by subscriber 'A' is lightly loaded or not congested, a quota consumption rate for subscriber 'A' may be adjusted from 100% to 40% for all data types, except video which may maintain a quota consumption rate of 100% (e.g., the "normal" quota consumption rate).

PRG module 204 may be any suitable entity (e.g., software executing on a processor) for generating and/or providing policy information to one or more entities, such as PGW 108 or a PCEF. PRG module 204 may access various databases and/or data storage 206. PRG module 204 may also communicate with various nodes and entities in network 100. For example, PRG module 202 may receive quota usage information and/or other information from QCRA module 202.

In some embodiments, PRG module 204 may generate a PCC rule that includes a data usage quota modified by a quota consumption rate. For example, PRG module 204 may generate a PCC rule indicating to PGW 108 that a certain flow associated with a subscriber may consume up to 1.5 GB of data. In this example, the 1 GB quota may be based on a unconsumed quota of 600 megabytes (MB) divided by a quote consumption rate of 0.4. After generating one or more PCC rules, PRG module 204 may provide the PCC rules to other entities, such as PGW 108, where the PCC rules can be enforced.

Data storage 206 may include any suitable entity (e.g., a non-transitory computer readable medium) for storing data associated with data usage, including data usage quotas, quota consumption rates, triggers, and data usage rules. Data storage 206 may be accessible to policy node 200, QCRA module 202, PRG module 204, and/or other entities. In some embodiments, data storage 206 may be integrated with policy node 200 or located externally to policy node 200.

Figure 3:
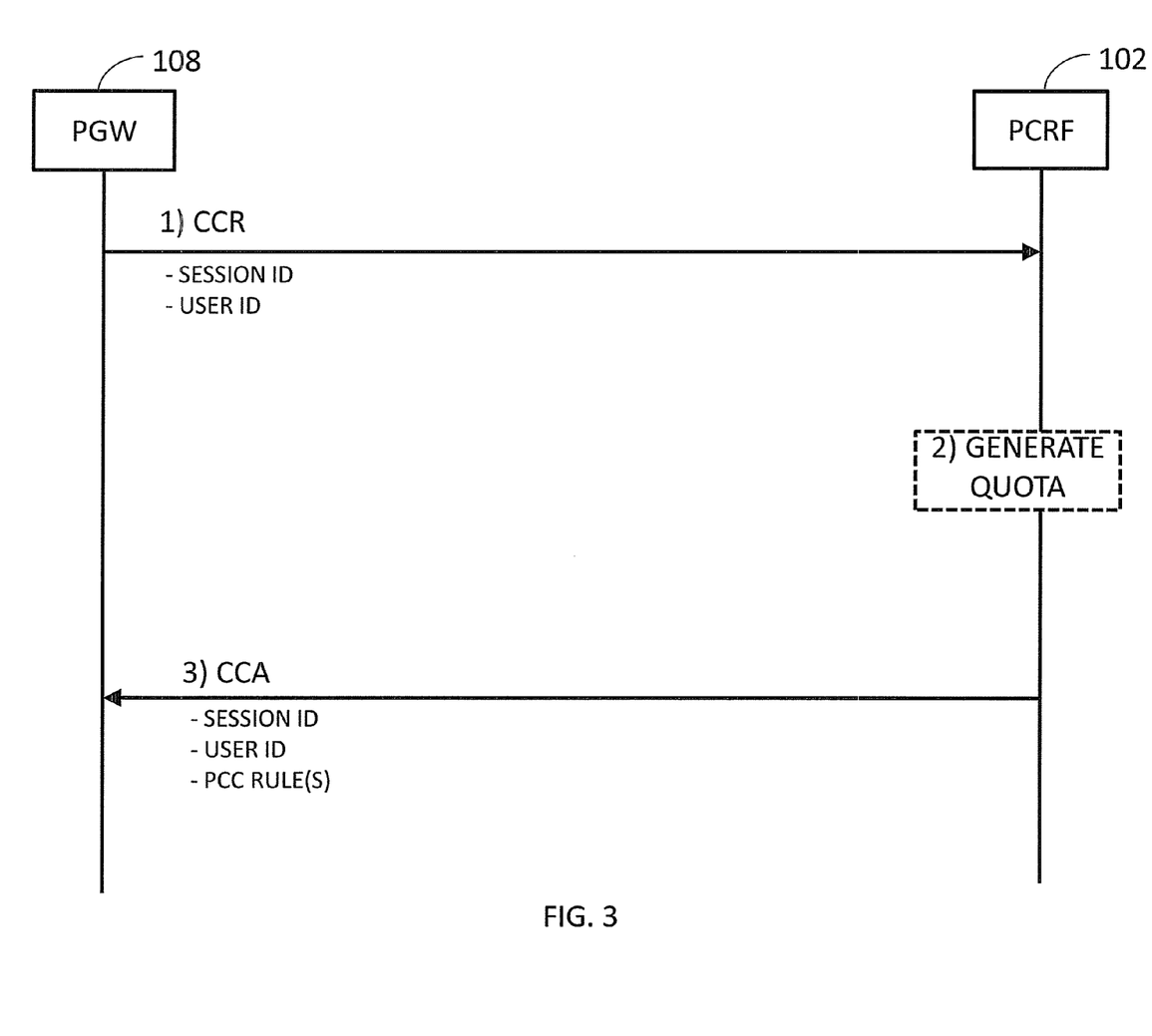
FIG. 3 is a diagram illustrating an exemplary message flow for adjusting a quota consumption rate according to an embodiment of the subject matter described herein.

FIG. 3 is a diagram illustrating an exemplary message flow for adjusting a quota consumption rate according to an embodiment of the subject matter described herein. As shown in FIG. 3, at step 1, PGW 108 may transmit a credit control request (CCR) message to PCRF 102. The CCR message may include a session identifier and a user identifier. In some embodiments, the CCR message may be transmitted over a Gx interface session.

At step 2, in response to receiving a CCR message, PCRF 102 may access a database containing quota usage information. For example, PCRF 102 may use a received user identifier to obtain a subscriber's unused or remaining data usage quota and a quota consumption rate.

In some embodiments, a retrieved quota consumption rate may be an unadjusted rate, such as a base rate or a rate predetermined by a service provider. In some embodiments, a retrieved quota consumption rate may be an adjusted rate, such as a rate adjusted based on a promotion, network congestion, or a service plan.

At step 3, PCRF 102, or modules therein, may generate a data usage quota using a quota consumption rate. For example, after identifying a subscriber's unused or remaining data usage quota and a quota consumption rate, PCRF 102 may modify the data usage quota by dividing an unconsumed data usage quota associated with the subscriber by the adjusted quota consumption rate.

PCRF 102, or modules therein, may use the quota usage information and other information to generate one or more PCC rules. In some embodiments, PCRF 102 may utilize the quota usage information as well as current network condition data (e.g., obtained from PGW 108) to determine the PCC rule(s) to be applied to the subscriber.

At step 3, PCRF 102 may be configured to generate and send a credit control answer (CCA) message containing a session identifier, a user identifier, and the PCC rule(s) to PGW 108.

In some embodiments, a re-authorization request (RAR) message may be sent by PCRF 102 to PGW 108 via a Gx interface connection. For example, after a certain amount of time has elapsed or after a quota consumption rate has changed, PCRF 102 may send a RAR message with updated quota information and/or updated PCC rules. In response, PGW 108 may generate and send a re-authorization answer (RAA) message back to PCRF 102, which includes the session identifier and a response code. In some embodiments, the RAA message may be sent by PGW 108 to PCRF 102 via a Gx interface connection.

Figure 4:
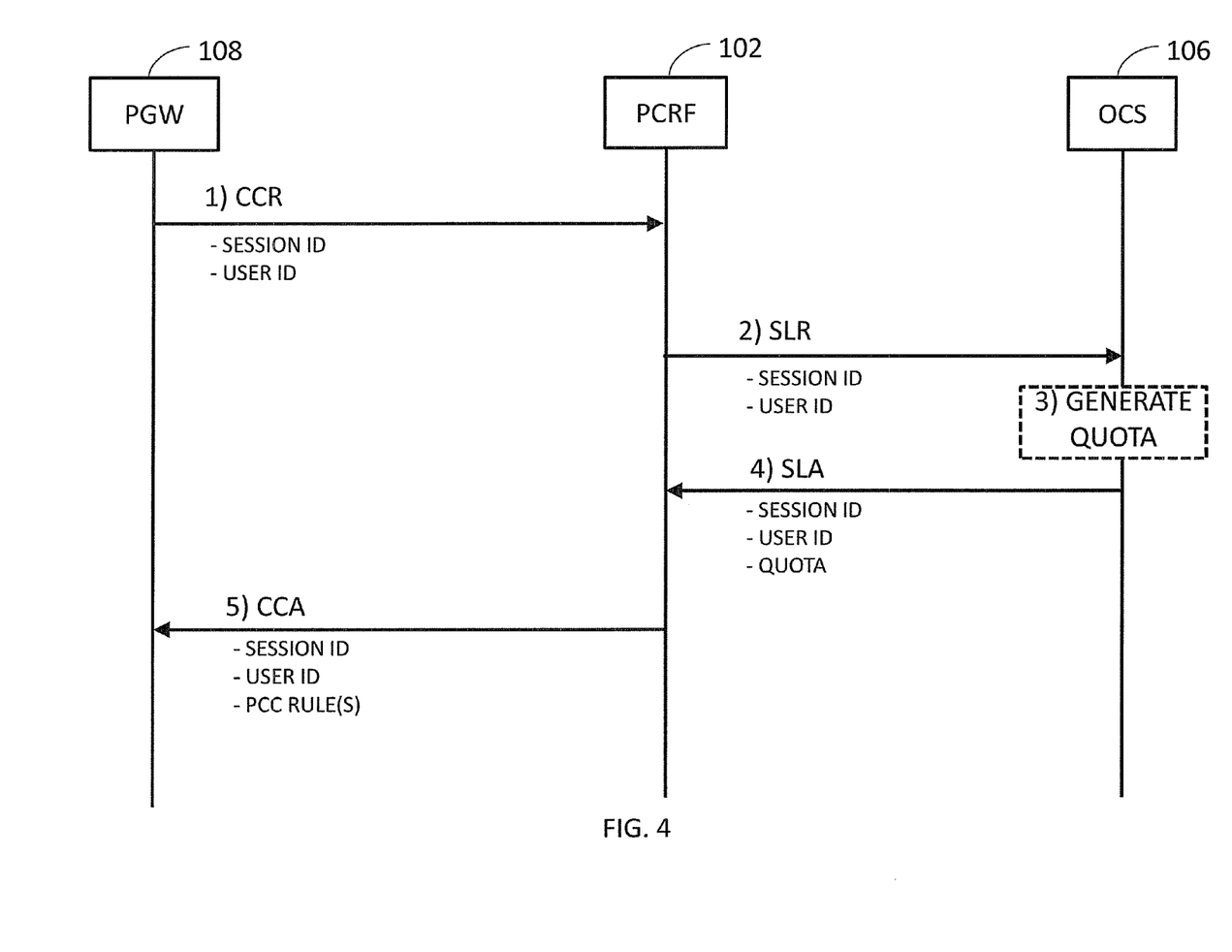
FIG. 4 is a diagram illustrating an exemplary message flow for adjusting a quota consumption rate according to another embodiment of the subject matter described herein.

FIG. 4 is a diagram illustrating an exemplary message flow for adjusting a quota consumption rate according to another embodiment of the subject matter described herein. As shown in FIG. 4, at step 1, PGW 108 may transmit a credit control request (CCR) message to PCRF 102. The CCR message may include a session identifier and a user identifier. In some embodiments, the CCR message may be transmitted over a Gx interface session.

At step 2, in response to receiving a CCR message, PCRF 102 may transmit a query and subscription request message, such as a spending limit report request (SLR) message, to OCS 106. As used herein, the query and subscription request message may be communicated over an Sy interface session. For example, the Sy interface session may include a dedicated and direct interface session existing between PCRF 102 and OCS 106. In some embodiments, the Sy session may be established when the subscriber attaches to a network.

In some embodiments, the query and subscription request message may include a spending limit report request message that may be communicated from PCRF 102 to OCS 106 via an Sy interface session. The query and subscription request message may include a session identifier, a user identifier, and/or other information.

Upon receiving the query and subscription request message, OCS 106 may access database 116 (e.g., either a local database or an external database) containing quota usage information. For example, OCS 106 may use a received user identifier to obtain a subscriber's unused or remaining data usage quota and a quota consumption rate.

At step 3, OCS 106, or modules therein, may generate a data usage quota using a quota consumption rate. For example, after identifying a subscriber's unused or remaining data usage quota and a quota consumption rate, OCS 106 may modify the data usage quota by dividing an unconsumed data usage quota associated with the subscriber by the adjusted quota consumption rate.

At step 4, OCS 106 may generate a response message that includes quota usage information, such as a modified data usage quota, and provide the response message to PCRF 102. In some embodiments, the response message may include a spending limit report answer (SLA) message containing at least a session identifier and the PC-Service-Info, which is sent over the Sy interface session.

After receiving the SLA message from OCS 106, PCRF 102, or modules therein, may extract the quota usage information and other information from the response message to generate a PCC rule. In some embodiments, PCRF 102 may utilize the extracted usage information obtained from OCS 106 as well as current network condition data (e.g., previously obtained from PGW 108) to determine the PCC rule(s) to be applied to the subscriber.

In some embodiments, prior to generating a PCC rule, PCRF 102 may receive quota usage information and may adjust a data usage quota based on a quota consumption rate and/or additional information obtained by PCRF 102. For example, PCRF 102 may maintain a quota consumption rate for one or more subscribers and, after receiving a quota from OCS 106, may modify the received quota using the maintained quota consumption rate.

At step 5, PCRF 102, or modules therein, may be configured to generate and send a credit control answer (CCA) message containing a session identifier, and the PCC rule(s) to PGW 108.

In some embodiments, a RAR message may be sent by PCRF 102 to PGW 108 via a Gx interface connection. For example, after a certain amount of time has elapsed or after a quota consumption rate has changed, PCRF 102 may send a RAR message with updated quota information and/or undated PCC rules. In response, PGW 108 may generate and send a RAA message back to PCRF 102, which includes the session identifier and a response code. In some embodiments, the RAA message may be sent by PGW 108 to PCRF 102 via a Gx interface connection.

Figure 5:
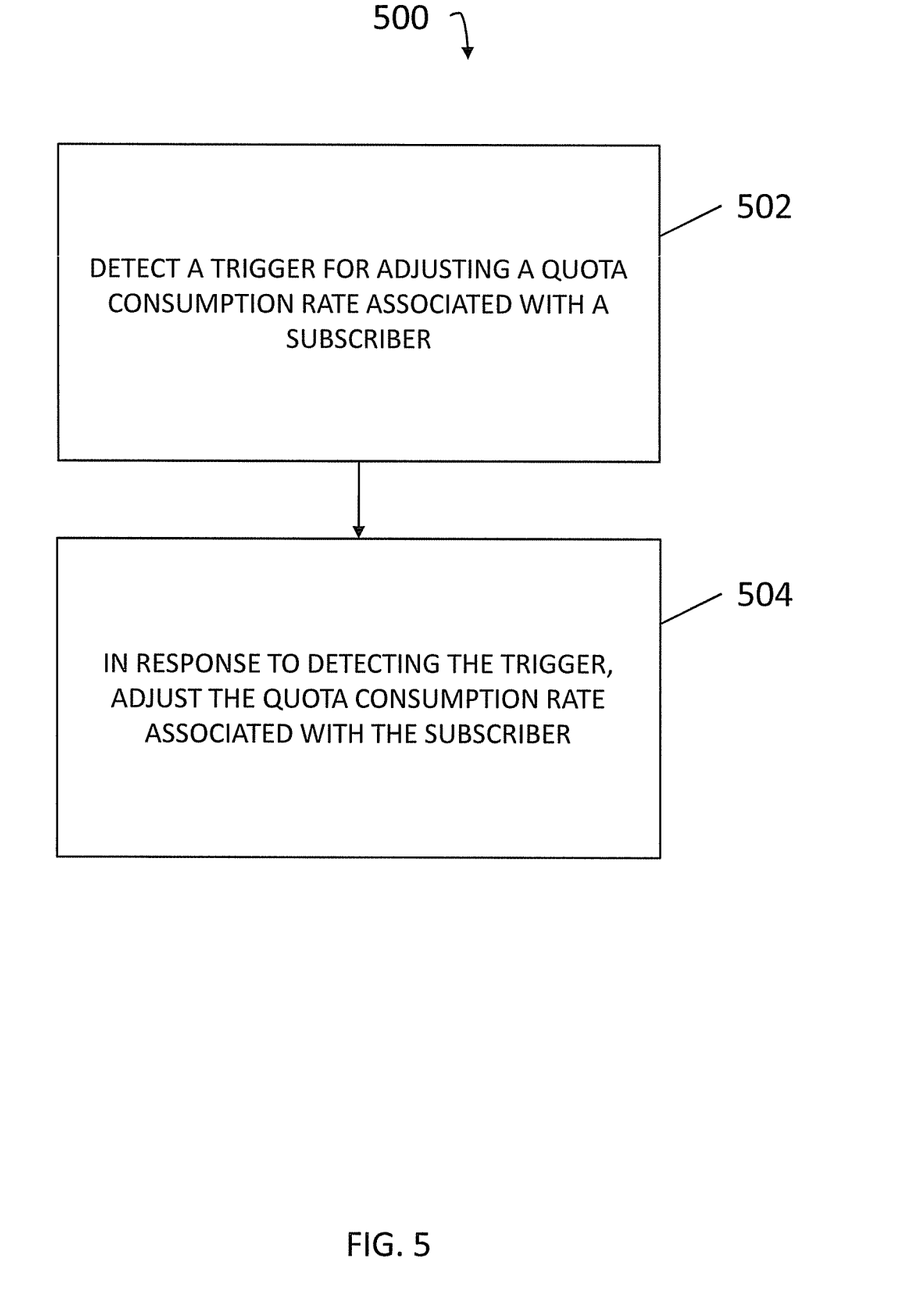
FIG. 5 is a diagram illustrating an exemplary process for adjusting a quota consumption rate according to an embodiment of the subject matter described herein.

FIG. 5 is a diagram illustrating an exemplary process 500 for adjusting a quota consumption rate according to an embodiment of the subject matter described herein. In some embodiments, exemplary process 500, or portions thereof, may be performed by or at PCRF 102, PGW 108, OCS 106, QCRA module 202, PRG module 204, policy node 200, a policy server, a PCEF, and/or another node or module.

In step 502, a trigger for adjusting a quota consumption rate may be detected. For example, a network operator or a network management system (NMS) may indicate to a QCRA module 202 at OCS 106 or PCRF 102 that the network is lightly loaded (e.g., underutilized). In response, QCRA module 202 may determine that a quota consumption rate for some subscribers should be decreased (e.g., from 100% of actual consumption to 50% of actual consumption). In another example, a network operator or NMS may send a message indicating that the network is congested to OCS 106 or PCRF 102. In response, QCRA module 202 at OCS 106 or PCRF 102 may determine that a quota consumption rate for some subscribers should be increased (e.g., from 50% of actual consumption to 100% of actual consumption).

In step 504, a quota consumption rate associated with the subscriber may be adjusted in response to detecting the trigger. In some embodiments, adjusting the quota consumption rate associated with the subscriber may include generating a data usage quota by dividing an unconsumed data usage quota associated with the subscriber by the adjusted quota consumption rate.

In some embodiments, an adjusted quota consumption rate may increase or decrease a data usage quota associated with the subscriber.

In some embodiments, a subscriber may be notified about the adjusted quota consumption rate before or after the adjusted quota consumption rate is applied.

In some embodiments, a subscription request or query message may be sent by PCRF 102 to OCS 106. The subscription request message may include a user identifier and/or other information, such as network conditions. The subscription request message may be sent to OCS 106 via an Sy interface session. OCS 106 may receive the subscription request message and may determine a remaining or unused data usage quota for the subscriber using a quota consumption rate. OCS 106 may send a response message to PCRF 102 containing data usage quota information. Using the received information, PCRF 102 may generate a PCC rule and send the PCC rule to a network element.

In some embodiments, at least one policy and charging control (PCC) rule associated with the adjusted quota consumption rate may be generated. In some embodiments, the at least one PCC rule may be communicated to a network element, such as PGW 108.

In some embodiments, a network element may include at least one of: a Diameter network element, a packet data network gateway (PGW), a policy and charging enforcement function (PCEF) node, a bearer binding and event reporting function (BBERF) node, a traffic detection function (TDF) node, and a deep packet inspection (DPI) function node.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for adjusting a quota consumption rate, the method comprising:
   at a first policy node, wherein the first policy node is an online charging system (OCS) node separate from a policy and charging rules function (PCRF):
   detecting a trigger for adjusting a quota consumption rate associated with a data usage quota of a subscriber; and
   in response to detecting the trigger, adjusting the quota consumption rate associated with the subscriber, wherein adjusting the quota consumption rate includes setting a rate at which the data usage quota is consumed by the subscriber to be different from a rate at which data is used by the subscriber.

2. The method of claim 1 comprising:
generating at least one policy and charging control (PCC) rule associated with the adjusted quota consumption rate; and
communicating the at least one PCC rule to a network element.

3. The method of claim 2 wherein the network element includes at least one of: a Diameter network element, a packet data network gateway (PGW), a policy and charging enforcement function (PCEF) node, a bearer binding and event reporting function (BBERF) node, a traffic detection function (TDF) node, and a deep packet inspection (DPI) function node.

4. The method of claim 1 wherein adjusting the quota consumption rate associated with the subscriber includes generating a data usage quota by dividing an unconsumed data usage quota associated with the subscriber by the adjusted quota consumption rate.

5. The method of claim 1 comprising:
notifying the subscriber about the adjusted quota consumption rate before or after the adjusted quota consumption rate is applied.

6. The method of claim 1 wherein the adjusted quota consumption rate increases or decreases a data usage quota associated with the subscriber.

7. The method of claim 2 wherein generating the PCC rule and sending the PCC rule is performed at the first policy node.

8. The method of claim 2 wherein generating the PCC rule and sending the PCC rule is performed at a second policy node, wherein the second policy node includes a policy server or the PCRF.

9. The method of claim 1 wherein the trigger includes a message, a congestion condition, a network condition, a time of day, a day, a promotion, a location, a service requested or provided, a type of traffic requested or provided, a subscription plan, an event, a type of user device, usage, information about the subscriber, information about a user device associated with the subscriber, information about a network associated with the subscriber, or a combination of two or more triggers.

10. A system for adjusting a quota consumption rate, the system comprising:
a first policy node, wherein the first policy node is an online charging system (OCS) node separate from a policy and charging rules function (PCRF), the first policy node comprising:
a quota consumption rate adjustment (QCRA) module configured to detect a trigger for adjusting a quota consumption rate associated with a subscriber and to adjust the quota consumption rate associated with a data usage quota of the subscriber in response to detecting the trigger, wherein adjusting the quota consumption rate includes setting a rate at which the data usage quota is consumed by the subscriber to be different from a rate at which data is used by the subscriber.

11. The system of claim 10 comprising:
a policy rule generation (PRG) module configured to generate at least one policy and charging control (PCC) rule associated with the adjusted quota consumption rate and to communicate the at least one PCC rule to a network element.

12. The system of claim 11 wherein the network element includes at least one of: a Diameter network element, a packet data network gateway (PGW), a policy and charging enforcement function (PCEF) node, a bearer binding and event reporting function (BBERF) node, a traffic detection function (TDF) node, and a deep packet inspection (DPI) function node.

13. The system of claim 10 wherein the QCRA module is configured to generate a data usage quota by dividing an unconsumed data usage quota associated with the subscriber by the adjusted quota consumption rate.

14. The system of claim 10 wherein the QCRA module or the PRG module is configured to notify the subscriber about the adjusted quota consumption rate before or after the adjusted quota consumption rate is applied.

15. The system of claim 10 wherein the adjusted quota consumption rate increases or decreases a data usage quota associated with the subscriber.

16. The system of claim 11 wherein the first policy node includes the PRG module.

17. The system of claim 11 wherein a second policy node includes the PRG module, wherein the second policy node includes a policy server or the PCRF.

18. The system of claim 10 wherein the trigger includes a message, a congestion condition, a network condition, a time of day, a day, a promotion, a location, a service requested or provided, a type of traffic requested or provided, a subscription plan, an event, a type of user device, usage, information about the subscriber, information about a user device associated with the subscriber, information about a network associated with the subscriber, or a combination of two or more triggers.

19. A non-transitory computer readable medium having stored thereon executable instructions that when executed by the processor of a computer control the computer to perform steps comprising:
at a first policy node, wherein the first policy node is an online charging system (OCS) node separate from a policy and charging rules function (PCRF):
detecting a trigger for adjusting a quota consumption rate associated with a data usage quota of a subscriber; and
in response to detecting the trigger, adjusting the quota consumption rate associated with the subscriber, wherein adjusting the quota consumption rate includes setting a rate at which the data usage quota is consumed by the subscriber to be different from a rate at which data is used by the subscriber.

* * * * *